UNITED STATES PATENT OFFICE.

JOHN COCKING, OF LONDON, ENGLAND.

IMPROVEMENT IN FELTED FABRICS FOR SURGICAL SPLINTS.

Specification forming part of Letters Patent No. 131,599, dated September 24, 1872.

*To all whom it may concern:*

Be it known that I, JOHN COCKING, of the city of London, England, have invented a new and useful Improvement in Process of Preparing Felt Material for Surgical Splints and for other purposes, of which the following is a specification:

This invention and discovery relate to the preparation of proplastic sheets for surgical splints, and for all the purposes for which it may be adapted, and consist in the process hereinafter described.

In carrying out my invention I take hair, wool, or other animal fiber, felted together in sheets. Vegetable fiber, as cotton or jute, to the amount of about one-fourth part of the fabric, may be substituted for the animal fiber. The porous sheets are then saturated with a proofing solution composed of thirty parts gum shellac; four parts frankincense; ten parts resin; two parts borax dissolved in water; and one part of methylated spirit applied cold. The fabric is then dried for about six hours, after which it is subjected to steam for half an hour and then exposed to a heat of from 160° to 180° for the space of from twenty-four to thirty-six hours, according to the weight of the fabric. The fabric thus proofed and dried is steeped for about twelve hours in a solution of sulphuric acid and water, which destroys the borax and hardens the proof. The sulphuric acid is in its turn destroyed by steeping the fabric in urine and water, and it is then immersed in running water until perfectly cleansed. The fabric is dried and is fit for use. The fabric thus prepared is stiff and rigid when cold, and elastic when subjected to heat. It may be made of any desired weight, and the rigidity may be diminished by slightly modifying the process.

When cut into strips for use as surgical splints the splints are made elastic or pliable by dropping in hot water or otherwise exposing them to heat, so that they will readily conform to the shape of the fractured limb. When cold they retain their shape and support the limb in the most perfect manner, without occasioning any pain to the patient. This material, although designed more especially for surgical splints, is applicable to other purposes. It may be used to good advantage for ladies' corsets and for similar purposes.

I do not confine myself to the precise proportions of the proofing ingredients used, nor to the precise process described, as both may be varied in many ways without departing from my invention.

Having thus described my invention, I claim as new and desire to secure by Letters Patent—

The above-described mode of preparing material for surgical splints and other purposes, substantially as set forth.

The above specification of my invention signed by me this 2d day of December, 1871.

JOHN COCKING.

Witnesses:
W. MULLER,
S. J. EDWARDS.